(No Model.)
C. WICKSTEED.
STAND FOR BICYCLES.
No. 256,936. Patented Apr. 25, 1882.
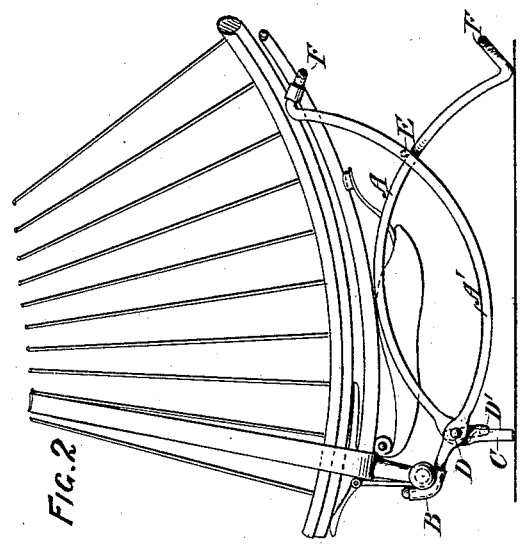
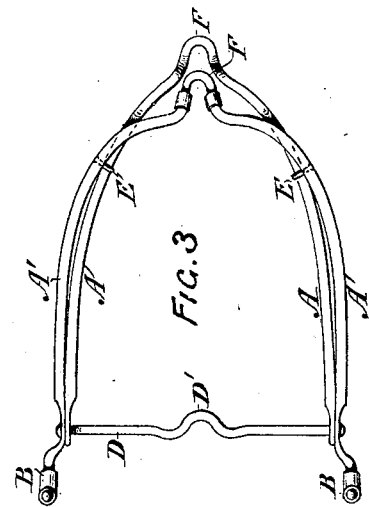
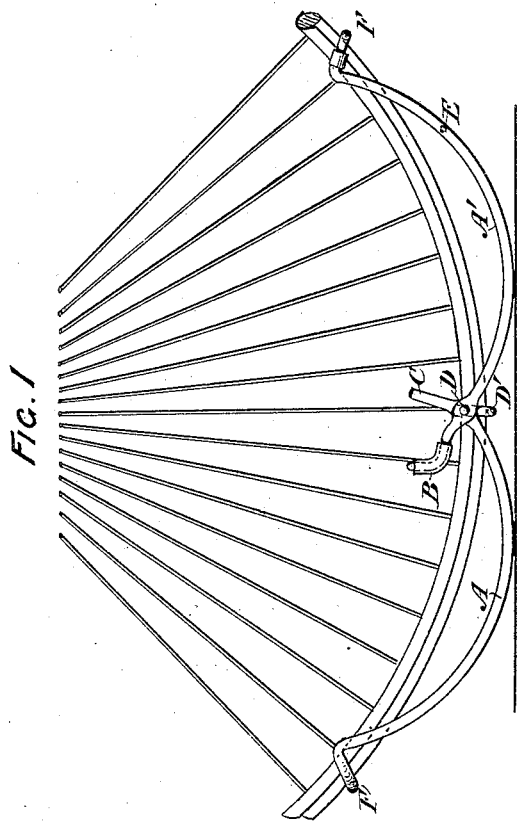
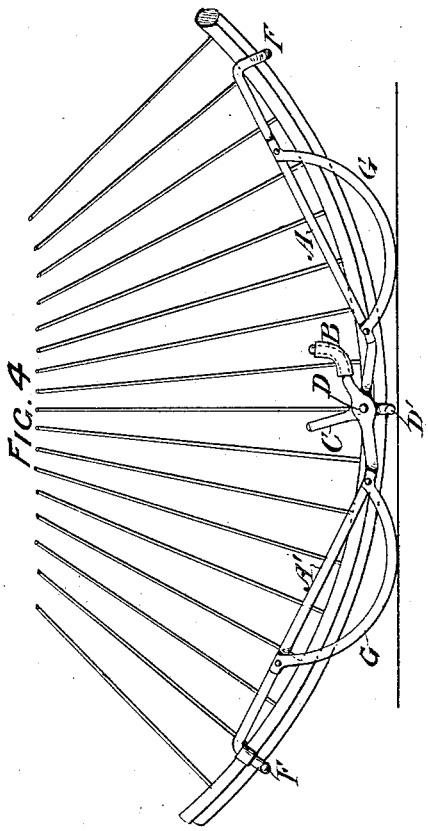
Witnesses
Wm. A. McClure
G. B. Fowler
Inventor
Charles Wicksteed
pr Henry Orth
atty

UNITED STATES PATENT OFFICE.

CHARLES WICKSTEED, OF KETTERING, COUNTY OF NORTHAMPTON, ENGLAND.

STAND FOR BICYCLES.

SPECIFICATION forming part of Letters Patent No. 256,936, dated April 25, 1882.

Application filed March 6, 1882. (No model.) Patented in England March 8, 1880.

*To all whom it may concern:*

Be it known that I, CHARLES WICKSTEED, a subject of the Queen of Great Britain, residing at Kettering, in the county of Northampton, in the Kingdom of Great Britain, have invented a new and useful Stand for Bicycles, (for which I have obtained a patent in Great Britain, No. 1,001, bearing date 8th of March, 1880,) of which the following is a specification.

The object of my invention is a stand capable of holding a bicycle in an upright position when run onto it, and also of holding it in an inverted position, as for cleaning, &c., when so required; and the nature and operation of it will be best understood by reference to the accompanying drawings, in which like letters of reference represent like parts.

Figure 1 shows the stand open, as when holding a bicycle in an upright position, a segment of a wheel being shown in place. Fig. 2 shows a side view of the stand folded up in position for holding an inverted bicycle. Fig. 3 is a plan of the folded stand; and Fig. 4, a similar view to Fig. 1, but the form of the stand is somewhat modified, as will be presently explained.

A A' are two frames, each shaped somewhat after the manner of an isosceles triangle. Their actual shape, however, will be best understood from the drawings themselves. These triangular frames A A' are jointed together at their bases by a rod, D, which forms a hinge upon which they can turn for opening out or folding up. Both frames have recesses F formed at what may be called the "apex of the triangle," and frame A has its ends C produced beyond the joint D, the object of which is seen in Fig. 2, where they act as feet to raise the stand sufficiently high from the ground to clear the saddle of the inverted bicycle when placed upon it. In frame A' the ends are also produced beyond the joint, but are shaped into hooks B, which carry the handle-bar of the inverted bicycle, the backbone being supported in the recess F. (See Fig. 2.) The ends B of frame A' are spread out sidewise, so as to form a broader base for the bicycle to rest upon. (See Fig. 3.) Inwardly-projecting pins or equivalent E, Fig. 3, prevent frame A' from crossing too far over frame A. The rod D is cranked at its center D', as shown in Fig. 3.

The action of this stand is as follows: For holding the bicycle in an upright position it is placed upon the ground open, when it will take a form somewhat similar to that shown in Fig. 1. The bicycle is then wheeled onto it, and the tire first touches, say, the apex F of frame A', which is depressed, the rod D being at the same time raised by reason of the curved shape of A'. The crank or bend D' is next reached by the wheel and depressed by its weight, and this forcing down of the rod D raises the two apices F of frames A' and A, causing them to grip the wheel firmly, as shown in Fig. 1.

The action of the form shown in Fig. 4 is exactly the same as that of Fig. 1, the difference being that instead of curving the frames A and A' they are made straight, and curved legs or their equivalent G are added, so as to give the rolling motion.

For holding the bicycle in an inverted position the frames are folded over till they assume the position shown in Fig. 2, frame A resting on the ground upon its legs C, and apex F and frame A' being in the proper position to receive the bicycle, which is turned over onto the stand, the handle-bar resting in the hooks B and the backbone being supported in the apex F. By adopting the curves as shown in the accompanying drawings, or curves substantially similar, the stand balances or adapts itself so that its normal position is such that the bicycle may be run on without the stand being specially set for it.

Those parts of the stand—such as the apex F and hooks B of frame A'—which are liable to come in contact with bright or painted parts of the bicycle may with advantage be wrapped round with some material to save the polish or paint. India-rubber tubing placed on during the process of manufacture is good at first; but it is apt to stretch. So I generally wrap a strip of leather or the like round and cement it on. In practice I employ iron rods as the material of which the stands are made. Nevertheless it is evident that other materials may be used—as, for instance, the stands could be made of wood, and, though more clumsy, might be made to work just as well.

As shown in Fig. 1, the stand is suitable for holding a complete bicycle or a loose wheel; or if the shape and proportions be suitably modified it can be used for holding other wheels, such as those of a cart or buggy.

What I claim as my invention, and desire to secure by Letters Patent, is—

1. A bicycle-stand composed essentially of two frames hinged together for folding one over the other, and provided with means for holding a bicycle upright off the ground when said frames are unfolded, as described.

2. A bicycle-stand composed essentially of two frames hinged together for folding one over the other, and provided with means for holding a bicycle in an inverted position off the ground when so folded, as and for the purpose specified.

3. The curved frames A A', jointed together by the cross-rod D, and having their ends prolonged beyond said joint and forming respectively the hooks B and legs C, substantially as set forth and shown.

4. The combination of the frame A, having extensions or legs C, with and connected to the frame A', having extensions or hooks B, and capable of being folded over upon frame A, the combined frames then forming a stand suitable for holding a bicycle in an inverted position, substantially as set forth and shown.

5. The combination of the jointed frames A A', having recesses F at their extremities, with the centrally-cranked rod D, whereby the wheel may be run onto the stand and cause said stand to grip its periphery in the said recesses F by reason of the weight of the wheel depressing the central rod, substantially as set forth.

6. The frames A A', hinged together for folding one over the other, and having the recesses F, bearings B, and legs C C, in combination with the stops or lugs E E, substantially as and for the purposes specified.

CHARLES WICKSTEED.

Witnesses:
ALFRED J. BOULT,
J. WATT.